Patented Mar. 14, 1950

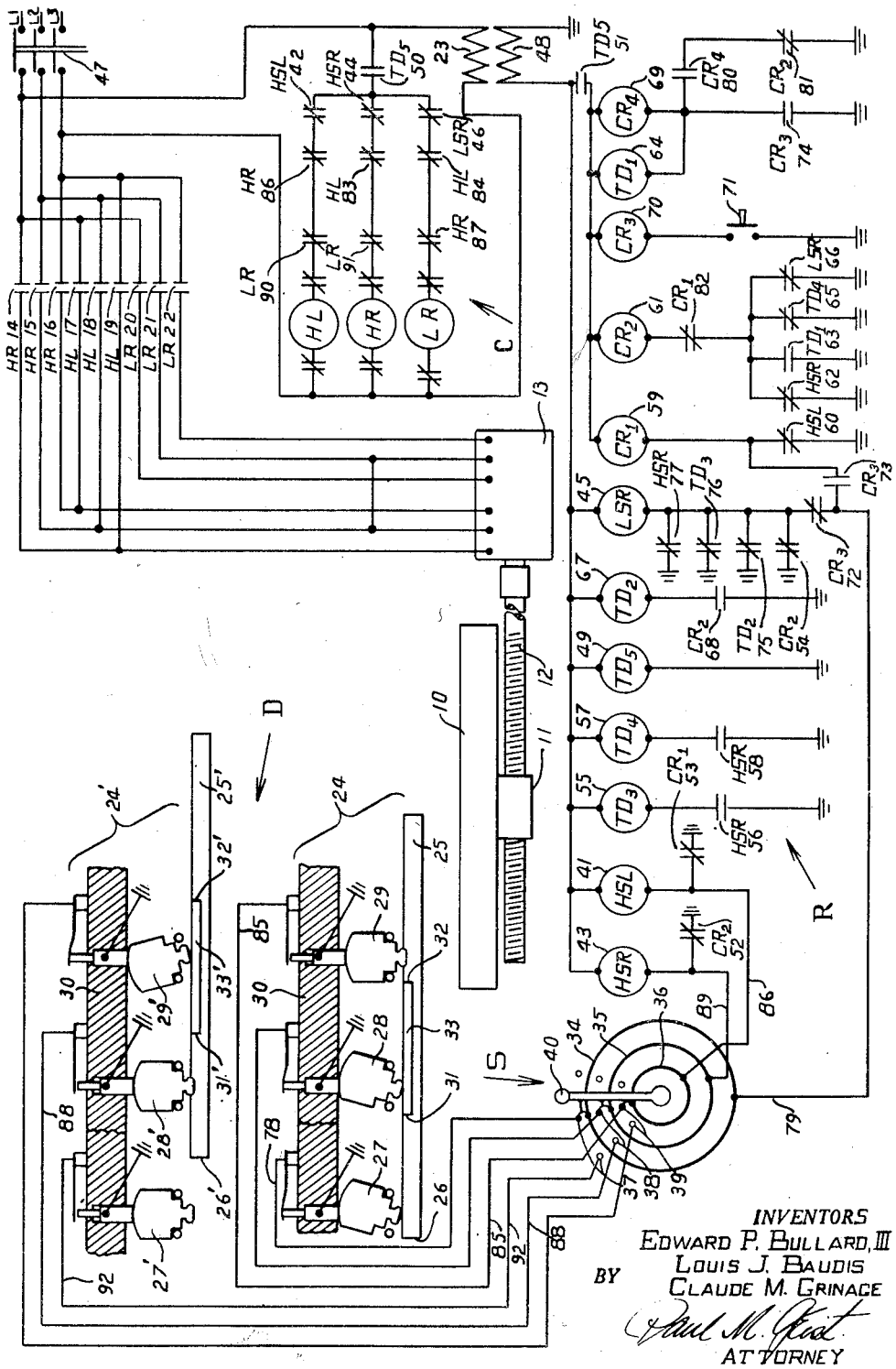

2,500,150

UNITED STATES PATENT OFFICE 2,500,150

POSITIONING APPARATUS

Edward P. Bullard, III, and Louis J. Baudis, Fairfield, and Claude M. Grinage, Bridgeport, Conn., assignors to The Bullard Company, a corporation of Connecticut Application March 24, 1947, Serial No. 736,704

19 Claims. (Cl. 318—277)

This invention relates to apparatus for automatically positioning a member along a path of travel. It deals with subject matter similar to that shown, described and claimed in application Serial Number 736,702, filed March 24, 1947, in the name of Edward P. Bullard, III.

The above-identified application discloses a movable member, termed a primary means, that is adapted automatically to be positioned, in accordance with a desired selection, at any one at a time of more than two locations along a path of travel. In that case the primary means is moved uni-directionally at a relatively rapid rate by a reciprocating fluid motor to an intermediate location that bears a fixed relation to the selected location regardless of the side of the final location on which said primary means initially rests, and when it initially does not lie between the intermediate and final locations. The primary means is moved by the fluid motor at a relatively slow speed from the intermediate location to the final location and when it initially lies between said locations.

The principal object of this invention is to maintain the sequence of movements obtained by the reciprocating fluid motor of the above-identified application, but by employing a reversible two-speed rotary motor device adapted to be positively coupled to, and for effecting the movement of the primary means.

Other objects of the invention include, the provision of such an apparatus in which the movement of the primary means for any selected location is always initiated in the correct direction by an always identical, non-selective operation; the provision of such an apparatus in which the primary means is ultimately moved to the selected location at a relatively slow speed, although it is, depending upon its initial location, moved uni-directionally at a relatively rapid speed to an intermediate location which always bears a definite relation to the finally-selected location; the provision of such an apparatus, the operation of which when initiated by a non-selective act, causes a further selection to be automatically effected so that the primary means initially moves toward a selected work location regardless of its previous location; and the provision of such an apparatus including a primary means movable in two directions along a path of travel such that it can be positioned at any pre-determined location therealong and embodying a control which when rendered effective by a non-selective act, automatically selects and initiates the correct direction of movement of the member toward the pre-determined location.

The above, as well as other objects and novel features of the invention will become apparent from the specification and accompanying drawing in which the single figure represents a schematic diagram of apparatus to which the principles of the invention have been applied.

The principles of the invention are applicable to any appartus wherein it is desired to locate a member at any one at a time of more than two locations along a path of travel. They will be described as applied to controlling the operation of a reversing, multi-speed electric motor for moving a primary means in either direction along a path of motion by providing relative rotation between a screw and nut associated therewith. Of course, a rack and pinion drive may be substituted with equal facility for the nut and screw, and other rotary motor devices may be employed such as hydraulic rotary motors, fluid turbines, and even two non-reversing oppositely rotatable motors.

While the invention will be described in connection with the movement of a primary means along a single path, it is, of course, within the scope of this invention to control the movement of two primary means along separate paths such as is the case in a horizontal boring mill; or one primary means along intersecting paths such as is the case when it is desired to move the primary means universally in a singel plane in the manner shown in application Serial Number 571,637, filed January 6, 1945, now Patent No. 2,473,506, in the name of Edward P. Bullard, III.

Referring to the drawing, a primary means 10 is mounted within ways for reciprocation therealong. It may be a work-supporting table, a tool support or in fact any movable member that is required to be located at more than two locations, one at a time along a path of movement. A nut 11 is rigidly attached to the lower surface of the primary means 10, threadingly receiving a motion-transmitting screw 12. The screw 12 may be coupled directly to a motor 13 or a speed reduction unit may be included between the two. The motor 13 is a three phase, two speed, separate winding, reversing motor and is provided with the usual control circuit C. This circuit comprises three normally open HR switches 14, 15 and 16 which when closed cause the motor to rotate in a direction and at a speed to effect rightward relatively rapid motion of the table 10. It also includes three normally open HL switches 17, 18 and 19, which when closed cause the motor to rotate in a direction and at a speed to effect leftward relatively rapid motion of the table 10. Additionally, there are three normally open LR switches 20, 21 and 22 which when closed cause the motor 13 to rotate in a direction and at a speed to effect rightward relatively slow motion of the table 10. The circuit C also includes an HL (high left) control relay; and HR (high right) control relay and an LR (low right) control relay. Each of these relays is provided on its opposite side with conventional normally-closed overload switches. The line including the HL control relay has in series with it normally-closed LR and HR switches that open when HR or LR control relays are energized. The HR relay circuit includes LR and HL switches; and that for relay LR includes HR and HL switches for the same purpose. The lines including the three relays are connected in parallel with the primary 23 of a transformer that is connected across lines L₁ and L₃.

The automatic positioning of the primary means 10 at any one at a time of more than two locations along its path of travel within a cycle, by controlling the operation of motor 13, involves the cooperative action of a detector D, a selector S and a relay circuit R.

The detector D comprises a plurality of units 24, 24' one for each position along the path of movement of the primary means at which it is desired to be located. There may be as many units 24 as desired although twenty to thirty usually suffice for most jobs performed on such apparatus as horizontal boring mills. The units 24 in the present embodiment, include a reciprocable, manually-adjustable strip 25 that is equal in length to the path of travel of the primary means 10. The strip 25 includes a surface 26 for determining a work location selected at which it is desired to locate the primary means, and since this location may be anywhere along the path of travel thereof, the support containing the grooves for strips 25, 25' must extend a distance more than twice that of the path of travel of the primary means 10.

The unit 24 also includes three switches 27, 28 and 29. These switches are rigidly mounted in spaced relation on an arm 30 that is attached to and movable with the primary means 10. Arm 30, therefore, represents the location of the primary means at any instant along its path of travel. Switch 27 cooperates with end surface 26, while switches 28 and 29 cooperate with ends 31 and 32, respectively, of a cam 33 fixed to the side of strip 25. Accordingly, switches 28 and 29 are themselves aligned but laterally spaced slightly from switch 27. The type of switches 27, 28 and 29 is the same as that shown, described and claimed in application Serial Number 586,799, filed April 5, 1945, in the name of Edward P. Bullard, III, to which application reference is made for specific details. As described in the above-referred-to application, each switch is extremely thin so that a great many may be mounted on the support 30 within a relatively small space. Each strip 25 is extremely thin also and consumes no more space than its cooperating switches 27, 28 and 29, so that twenty to thirty individually-adjustable strips 25 and their cooperating switches 27, 28 and 29 consume relatively little space. In the embodiment shown, only two strips 25, 25' and their cooperating switches are shown. The strip 25 is shown adjusted so that the primary means 10 lies to the right side of the selected location defined by end surface 26; while strip 25' shows the relation when the primary means is positioned to the left of the selected location.

Of course, by employing a self-locking switch for switch 27, of the type shown, described and claimed in application Serial Number 736,702, filed March 24, 1947, in the name of Edward P. Bullard, III, the strip 25 need only be long enough to support cam 33 in a fixed relation to end surface 26. This would permit employing grooved supports therefor which are only slightly longer than the path of travel of the primary means 10.

The cam 33 is fixed to strip 25 such that when switch 29 has just been closed by engagement with surface 32 as arm 30 moves leftwardly from its position in regard to unit 24, the switch 27 will have become opened and be spaced approximately .030 inch from the end 26. The primary means will then be located in an intermediate location from which it is to be moved to the selected work location. The length of the cam 33 is critical, and must be such that switch 28 remains closed as the primary means arrives at the intermediate location and when switch 29 is initially closed by its engagement with surface 32. The reason for this critical relation will appear hereinafter in the description of the operation of the apparatus. Furthermore, when switch 28' has just been closed by engagement with surface 31' as arm 30 moves rightwardly from its position in regard to unit 24', switch 27' will be open and spaced approximately .030 inch from surface 26'.

Since a great many units 24 are employed in the practical embodiment of the invention, one for each location at which the primary means is to be positioned, the selector or tertiary means S is designed to render effective at the will of the operator, any one at a time of the units 24. It comprises a series of concentric current-carrying rings 34, 35 and 36, and a series of radially arranged sets of three contacts 37, 38 and 39, one set for each unit 24. A handle 40 may be employed having contacts that bridge the rings 34, 35 and 36 with their corresponding contacts in the sets including contacts 37, 38 and 39. It is entirely within the principles of the invention to operate the selector S by any mechanism as well as manually, whether or not such operation is caused in a definite sequential order. Such devices may be hydraulic, electric or otherwise and they are all within the meaning of the expression "tertiary means for selecting" as used in the claims.

Within the automatic phase of the present invention, the primary means 10 is uni-directionally moved as rapidly as possible to the intermediate location from which it is moved relatively slowly to the selected work location. Of course, if the primary means is located between the intermediate location and the selected work location it moves only at a relatively slow speed to the latter. Furthermore, the intermediate location being always on one and the same side of the location, movement to the selected work location is always in the same direction. These requirements involve means for effecting the movement of the primary means relatively rapidly in both directions and relatively slowly in only one. Relatively rapid movement of the primary means to the left is caused by de-energizing a normally-energized HSL control relay 41 thereby permitting closing of an HSL switch 42 which in turn energizes the HL control relay for the motor 13. Energizing relay HL causes closing of HL switches 17, 18 and 19 causing the motor to rotate at a relatively fast rate, and such that table 10 moves leftwardly. Relatively rapid movement of the primary means 10 rightwardly is effected by de-energizing an HSR relay 43, which closes an HSR switch 44, energizing the HR control relay for motor 13. This causes the HR switches 14, 15 and 16 to close effecting relatively rapid rotation of motor 13 in a direction to move table 10 rightwardly at a fast speed. Relatively slow movement of the primary means 10 rightwardly is effected by de-energizing an LSR control relay 45 which closes LSR switch 46 thereby energizing motor control relay LR. This closes LR switches 20, 21 and 22 effecting relatively slow rotation of motor 13 in a direction to move the table 10 rightwardly.

When a selection of one of the detector units 24 is made, by moving handle 40 manually in the present embodiment, a fourth means is operated, by a non-selective act involving identical action each time it is operated, which automatically selects and initiates the proper direction of rotation of the motor so that it initially causes the primary means 10 to move uni-directionally to the intermediate location regardless of its previous position. This means in the present invention is a relay circuit R. It can best be understood by describing its operation, first with the primary means 10 initially on the right side of the selected work location as defined by surface 26; and thereafter with the primary means 10 initially on the left side of the selected work location as defined by surface 26'.

Closing a main circuit switch 47, energizes the primary 23 of the transformer. This induces a current in the secondary 48 which energizes TD—5 relay 49 causing, after a pre-determined interval, closing of TD—5 switches 50 and 51. None of the motor control relays HL, HR or LR become energized, however, since HSL switch 42; HSR switch 44 and LSR switch 46 are held open as will immediately be explained. The TD—5 switch 51 is set to close a sufficient time interval after energizing TD—5 relay 49 so that control relays HSR, HSL and LSR are energized before current passes to control relays CR1 and CR2. This insures HSR, HSL and LSR control relays 43, 41 and 45, respectively, to become energized through CR2 switch 52; CR1 switch 53; and CR2 switch 54, respectively. This condition existing, it is evident that TD—3 relay 55 is energized since HSR switch 56 closes upon energization of HSR relay 43. TD—4 relay 57 is energized since HSR switch 58 is closed for the same reason. CR1 relay 59 is de-energized because HSL switch 60 has opened due to energization of HSL control relay 41. CR2 relay 61 is also de-energized because HSR switch 62 is open due to the energization of HSR control relay 43; TD—1 switch 63 is open since TD—1 relay 64 is de-energized; TD—4 switch 65 is open due to energization of TD—4 relay 57; and LSR switch 66 is open due to energization of LSR relay 45. Since CR2 relay 61 is de-energized, TD—2 relay 67 is de-energized because CR2 switch 68 is open. Finally, CR4 relay 69 is de-energized because its circuit can only be completed upon energizing CR3 relay 70 by closing starting button 71.

With the apparatus in the condition as above outlined and handle 40 in the position shown, switches 27 and 28 are closed, while switch 29 is open. Switch 28 may be open depending upon the distance the primary means 10 is to the right of the selected work location as determined by the surface 26.

Pushing start button 71 energizes CR3 relay 70, opening CR3 switch 72; closing CR3 switches 73 and 74. Opening CR3 switch 72 prevents a sneak circuit through CR2 switch 54 or TD—2 switch 75. TD—3 switch 76 and HSR switch 77 are open since control relays TD—3 and HSR relays 55 and 43, respectively, are energized. Closing CR3 switch 73 establishes a circuit from ground through switch 27, a line 78, ring 34, line 79, CR3 switch 73, CR1 relay 59, TD—5 switch 51, the secondary 48 to ground, energizing CR1 relay 59. Closing CR3 switch 74 energizes TD—1 relay 64 and CR4 relay 69—the latter closing CR4 switch 80 for holding these relays energized through normally-closed CR2 switch 81 after release of the push button 71. Energizing TD—1 relay 64 closes TD—1 switch 63 but CR2 relay 61 does not become energized because CR1 switch 82 has been opened by the energizing of CR1 relay 59.

Energizing CR1 relay 59 also opens CR1 switch 53 which de-energizes HSL relay 41. This causes closing of HSL switches 60 and 42. The closing of HSL switch 60 holds CR1 relay 59 after CR3 switch 73 opens upon release of the button 71. Closing of the HSL switch 42 energizes the HL relay for the motor 13, closing HL switches 17, 18 and 19, and opening HL switches 83 and 84 in the lines for the HR and LR motor circuit relays. Motor 13, accordingly, rotates at a relatively rapid rate in a direction causing the primary means 10 to move leftwardly until switch 29 is closed by engagement with surface 32 of cam 33. Closing switch 29 establishes a circuit from ground through switch 29, a line 85, ring 36, a line 86, HSL relay 41, secondary 48 to ground, re-energizing HSL relay 41. This opens HSL switches 60 and 42. The former de-energizes CR1 relay 59, and the latter causes de-energization of the HL motor circuit relay—stopping motor 13 so that the primary means comes to rest at the intermediate location with switch 27 open and spaced slightly to the left of surface 26. De-energization of CR1 relay 59 closes CR1 switch 82, energizing CR2 relay 61 through TD—1 switch 63 which has been held closed by energization of TD—1 relay 64. All other switches for CR2 relay 61, namely HSR switch 62; TD—4 switch 65 and LSR switch 66 are open at this instant.

Energizing CR2 relay 61 opens CR2 switches 52, 54, 81; and closes CR2 switch 68. Opening CR2 switch 52 does not de-energize HSR relay 43 because switch 28 is closed. The length of cam 33 is such as to insure that both switches 28 and 29 are closed when the primary means is at the intermediate location, and it is designed to maintain switch 28 closed while the primary means moves from the intermediate location to the selected work location.

Opening CR2 switch 54 does not immediately de-energize LSR relay 45 because TD—2 switch 75 is still closed. However, closing of CR2 switch 68, energizes TD—2 relay 67 causing TD—2 switch 75 to open, de-energizing LSR relay 45. TD—2 switch 75 is set to open a sufficient time interval after energizing TD—2 relay 67 to permit the screw 12 to stop rotating after the de-energization of the HL motor circuit control relay. This insures complete stopping of the leftward movement of the primary means before starting its rightward movement. Of course, in every instance in the present invention where time delay switches are employed to take care of the coasting of motor 13, braking means may be substituted with or without time delay switches.

De-energizing of LSR relay 45 closes LSR switch 66 to hold CR2 relay 61 after TD—1 switch 63 opens. It is recalled that CR2 switch 81 opened when CR2 relay 61 was energized which de-energized TD—1 relay 64. Of course, TD—1 switch 63 is set to open only after LSR switch 66 has closed, otherwise the CR2 relay 61 would have become de-energized preventing the apparatus from functioning.

De-energizing of LSR relay 45 permits closing of LSR switch 46 energizing the LR relay for the motor control circuit. Energizing LR relay closes the LR switches 20, 21 and 22 causing motor 13 to rotate at a slow speed, and in a direction to cause the primary means 10 to move rightwardly at a slow speed unit switch 27 is closed by contacting end surface 26. Closing switch 27 establishes a circuit from ground through switch 27, line 78, ring 34, line 79, CR3 switch 72, LSR relay 45, secondary 48 to ground, re-energizing LSR relay 45.

Re-energizing LSR relay 45 opens LSR switches 66 and 46. Opening LSR switch 66 de-energizes CR2 relay 61 permitting CR2 switches 52, 54 and 81 to close; and CR2 switch 68 to open. Opening of LSR switch 46 de-energizes the LR motor control relay which opens LR switches 20, 21 and 22, thereby stopping motor 13 so that the primary means comes to rest at the selected work location. The circuit R is then in the condition it was when start button 71 was pushed.

Moving the handle 40 counterclockwise one notch selects detector unit 24′ where the primary means 10 is on the left hand side of the selected work location as defined by surface 26′. In this position switches 27′ and 28′ are open. Switch 29′ is shown closed but may be open depending upon the distance the primary means is from the selected work location.

Closing the starting button 71 energizes CR3 relay 70, opening CR3 switch 72 and closing CR3 switches 73 and 74. Opening the CR3 switch 72 prevents the sneak circuit previously explained. Closing CR3 switch 73 will not energize CR1 relay 59 because switch 27′ is open. Closing CR3 switch 74 energizes TD—1 relay 64 and CR4 relay 69 which are then held, after CR3 switch 74 opens upon release of push button 71, by CR4 switch 80 closing.

Energizing TD—1 relay 64 closes TD—1 switch 63 energizing CR2 relay 61 which causes CR2 switches 52, 54 and 81 to open; and CR2 switch 68 to close. Opening CR2 switch 52 de-energizes HSR relay 43 causing HSR switches 77, 62 and 44 to close; and HSR switches 56 and 58 to open. Opening CR2 switch 54 does not de-energize LSR relay 45 because TD—2 switch 75 is closed. However, closing of CR2 switch 68 energizes TD—2 relay 67 causing opening of TD—2 switch 75. TD—2 switch 75 is set to open a sufficient time interval after CR2 switch 68 closes to permit HSR switch 77 to close, due to de-energization of HSR relay 43. This holds LSR relay 45 energized while HSR relay 43 is de-energized. Opening of HSR switch 56 de-energizes TD—3 relay 55 causing TD—3 switch 76 to close, for a purpose to be described later.

Opening of CR2 switch 81 de-energizes TD—1 relay 64 causing TD—1 switch 63 to open, but its opening is delayed until HSR switch 62 closes, due to de-energization of HSR relay 43—holding CR2 relay 61 energized. Opening HSR switch 58 de-energizes TD—4 relay 57 closing TD—4 switch 65 for a purpose to be described later.

Closing HSR switch 44 energizes the HR control relay for the circuit of motor 13. This closes HR switches 14, 15 and 16 causing motor 13 to rotate rapidly in a direction to move the primary means at a relatively fast speed in a rightward direction until switch 28′ is closed by engagement with surface 31′. Energizing HR relay also opens HR switches 86 and 87 in the lines for the HL and LR relays, respectively.

Closing switch 28′ establishes a circuit from ground through switch 28′, a line 88, ring 35, a line 89, HSR relay 43, secondary 48, to ground, re-energizing HSR relay 43. Re-energizing HSR relay 43 opens HSR switch 44, de-energizing HR motor control relay and stopping motor 13. The primary means then comes to rest at the intermediate location. Re-energization of HSR relay 43 also opens HSR switches 77 and 62; and closes HSR switches 56 and 58. At this instant, CR2 switch 54 and TD—2 switch 75 are open since CR2 relay 61 is still energized. Opening HSR switch 77 does not de-energize LSR relay 45 because TD—3 switch 76 is still closed since it is set to open a sufficient time interval after TD—3 relay 55 has been energized (by closing HSR switch 56) so that screw 12 will have come to rest or slowed down before applying the low speed rate of rotation to it. However, when HSR switch 56 closes TD—3 relay 55 energizes, and a definite time interval thereafter TD—3 switch 76 opens causing de-energization of LSR relay 45. In the meantime, HRS switch 62 has opened and TD—1 switch 63 is open, but CR2 relay 61 remains energized since TD—4 switch 65 is still closed and remains so for a delayed interval after HSR switch 58 closes energizing TD—4 relay 57. This delayed interval is necessary to permit LSR switch 66 to close (upon de-energization of LSR relay 45) so that CR2 relay 61 remains energized.

De-energization of LSR relay 45 also closes LSR switch 46 causing the energizing of the LR relay of the motor control circuit. Energizing LR relay opens LR switches 90, 91; and closes LR switches 20, 21 and 22. Closing of LR switches 20, 21 and 22 causes motor 13 to rotate at a slow speed, and in a direction to cause the primary means 10 to move relatively slowly in a rightward direction until switch 27′ closes by cooperating with surface 26′. Closing switch 27′ establishes a circuit from ground through switch 27′, a line 92, contact 37, ring 34, line 79, CR3 switch 72, LSR relay 45, secondary 48 to ground, re-energizing LSR relay 45. This causes LSR switch 46 to open de-energizing the LR relay and hence opening LR switches 20, 21 and 22 thus stopping motor 13 and the primary means at the selected work location. Re-energization of LSR relay 45 also opens LSR switch 66 de-energizing CR2 relay 61. De-energization of CR2 relay 61 closes CR2 switches 52, 54 and 81; and opens CR2 switch 68. Opening CR2 switch 68 de-energizes TD—2 relay 67 causing closing of TD—2 switch 75. The apparatus is then in the condition it was prior to closing push button 71 and another selection may be made and effected by closing push button 71 again.

Although the various features of the new and improved positioning apparatus have been shown and described in detail to fully disclose one embodiment of the invention, it will be evident that numerous changes may be made in such details and certain features may be used without others, without departing from the principles of the invention.

What is claimed is:

1. Apparatus comprising in combination, a primary means adapted automatically to be positioned at more than two work locations, one at a time, along a path of travel; rotatable mechanism positively coupled to said primary means for moving it to said work locations; a reversing motor adapted to be positively coupled to said rotatable mechanism; a secondary means comprising a unit for each work location, each unit including independently pre-settable elements relatively adjustable throughout the extent of the path of travel of said primary means for determining one of said work locations at which said primary means is to be located, whereby the movement of the primary means for the pre-setting of each unit of the secondary means is independent of the setting of all other units of said secondary means; a tertiary means having a position for indicating each unit of said secondary means, and a member adapted to be located in any of said positions to determine the unit of the secondary means desired; and a fourth means including a circuit independent of polarity for automatically selecting and initiating the correct direction of rotation of said reversing motor to initially cause it to move said primary means in the correct direction toward the work location determined by the unit of the secondary means selected by the tertiary means.

2. Apparatus comprising in combination, a primary means adapted automatically to be positioned at more than two work locations, one at a time, along a path of travel; rotatable mechanism positively coupled to said primary means for moving it to said work locations; a reversing motor adapted to be positively coupled to said rotatable mechanism; a secondary means comprising a unit for each location, each unit including independently pre-settable elements relatively adjustable throughout the extent of the path of travel of said primary means for determining one of said work locations at which said primary means is to be located, whereby the movement of the primary means for the pre-setting of each unit of the secondary means is independent of the setting of all other units of said secondary means; a tertiary means having a position for indicating each unit of said secondary means, and a member adapted to be located in any of said positions to determine the unit of the secondary means desired; and a fourth means requiring a non-selective act to initiate it and including a circuit independent of polarity for automatically selecting and initiating the correct direction of rotation of said reversing motor to initially cause it to move the said primary means toward the work location determined by the unit of the secondary means selected by the tertiary means.

3. Apparatus comprising in combination, a primary means adapted automatically to be positioned at more than two work locations, one at a time, along a path of travel; rotatable mechanism positively coupled to said primary means and adapted to move it to said work locations; a multi-speed reversing motor adapted to be positively coupled to said rotatable mechanism; a secondary means comprising a unit for each work location at which said primary means is to be located and including relatively adjustable elements for determining one of said work locations as well as a corresponding intermediate location, said intermediate location bearing a fixed relation to its corresponding work location; a tertiary means having a position for indicating each unit of the secondary means, and a member adapted to be located at any of said positions to determine the unit of the secondary means desired; and a fourth means including a circuit independent of polarity for automatically causing said reversing motor, when said primary means is not initially located between said intermediate and work locations, to move said primary means uni-directionally at a relatively rapid speed to said intermediate location regardless of the side of said work location on which said primary means initially is located, and thence to cause said reversing motor to rotate at a relatively slow rate of speed to effect movement of said primary means to the work location determined by the unit of the secondary means selected by the tertiary means.

4. Apparatus comprising in combination, a primary means adapted automatically to be positioned at more than two work locations, one at a time, along a path of travel; rotatable mechanism positively coupled to said primary means and adapted to move it to said work locations; a multi-speed reversing motor adapted to be positively coupled to said rotatable mechanism; a secondary means comprising a unit for each work location at which said primary means is to be located and including relatively adjustable elements for determining one of said work locations as well as a corresponding intermediate location, said intermediate location bearing a fixed relation to its corresponding work location; a tertiary means having a position for indicating each unit of the secondary means, and a member adapted to be located at any of said positions to determine the unit of the secondary means desired; and a fourth means, requiring a non-selective act to initiate it, for automatically causing said reversing motor, when said primary means is not initially located between said intermediate and work locations, to move said primary means uni-directionally at a relatively rapid speed to said intermediate location regardless of the side of said work location on which said primary means initially is located, and thence for causing said reversing motor to rotate at a relatively slow rate of speed to effect movement of said primary means to the work location determined by the unit of the secondary means selected by the tertiary means.

5. Apparatus comprising in combination, primary means adapted automatically to be positioned at more than two work locations, one at a time, along a path of travel; rotatable mechanism positively coupled to said primary means and adapted to move it to said work locations; a multi-speed reversing motor adapted to be positively coupled to said rotatable mechanism; secondary means including a unit for each work location at which said primary means is to be located, each unit including relatively adjustable elements for determining one of the work locations of said primary means, as well as an intermediate location that is always on the same side of, and bears a fixed relation to said work location; tertiary means having a position for indicating each unit of the secondary means, and a member adapted to be located in any of said positions to determine the unit of the secondary means desired; a relay circuit for initially causing said motor to rotate at a relatively rapid rate in the correct direction to cause said primary means to move relatively rapidly to, and beyond said work location to said intermediate location when said primary means is initially on the opposite side of said selected work location from said intermediate location; a relay circuit for initially causing said motor to rotate at a relatively rapid rate in the correct direction to effect uni-directional movement of said primary means at a relatively rapid speed to said intermediate location when said primary means initially is on the same side of said work location as said intermediate location and not between said intermediate and work locations; and a relay circuit for causing said motor to rotate at a relatively slow speed to effect relatively slow movement of said primary means from said intermediate work location to said selected location.

6. Apparatus comprising in combination, primary means movable in two directions along a path of travel and adapted automatically to be positioned at a pre-determined location therealong; rotatable mechanism positively coupled to said primary means and adapted to move it to said pre-determined location; a reversing motor adapted to be positively coupled to said rotatable mechanism; secondary means comprising a plurality of switches and a switch actuator relatively adjustable throughout the extent of travel of said primary means for determining said pre-determined location; and means requiring a nonselective act to initiate it and including means for automatically selecting and initiating the correct direction of rotation of said motor to cause said primary means initially to move in the correct direction toward said pre-determined location.

7. Apparatus comprising in combination, primary means movable in two directions along a path of travel and adapted automatically to be positioned at a pre-determined location therealong; rotatable mechanism positively coupled to said primary means, and adapted to move said primary means to said pre-determined location; a multi-speed reversing motor adapted to be positively coupled to said rotatable mechanism; secondary means comprising relatively adjustable elements for determining said pre-determined location as well as an intermediate location, said intermediate location bearing a fixed relation to said pre-determined location; means for automatically selecting and initiating the correct direction of rotation of said motor to cause it to move said primary means, when it initially does not lie between said intermediate and pre-determined locations, uni-directionally at a relatively rapid rate to said intermediate location regardless of the side of said pre-determined location on which said primary means is initially located; and means rendered effective upon said primary means arriving at said intermediate location for causing said motor to rotate at a relatively slow rate to move said primary means to said pre-determined location.

8. Apparatus comprising in combination, primary means movable in two directions along a path of travel and adapted automatically to be positioned at a pre-determined location therealong; rotatable mechanism positively coupled to said primary means and adapted to move it to said pre-determined location; a multi-speed reversing motor adapted to be positively coupled to said rotatable mechanism; a switch for determining the initial direction of rotation of said motor as well as said pre-determined location; separate switches for each direction of motion of said primary means for determining an intermediate location thereof that bears a fixed relation to said pre-determined location; an actuator for said switches, adjustable relatively thereto throughout the extent of movement of said primary means; means controlled by said switches for causing said motor to rotate, when said primary means is not initially located between said intermediate and said pre-determined locations, at a relatively rapid rate to cause said primary means uni-directionally to move to said intermediate location regardless of the side of said pre-determined location on which it is initially located; and means controlled by said switches for causing said motor to rotate at a relatively slow rate upon said primary means arriving at said intermediate location to cause slow movement of said primary means to said pre-determined location.

9. Apparatus comprising in combination, primary means adapted automatically to be positioned at more than two work locations, one at a time, along a path of travel; rotatable mechanism positively coupled to said primary means; a multi-speed reversing motor adapted to be positively coupled to said rotatable mechanism; secondary means comprising a unit for each work location at which said primary means is to be located, each unit including a switch for determining the initial direction of rotation of said reversing motor as well as one of said work locations, and separate switches for each direction of motion of said primary means for determining an intermediate location that bears a fixed relation to said work location; an actuator for each unit adapted to be adjusted relatively to its corresponding switches throughout the extent of the path of travel of said primary means; tertiary means having a position for indicating each unit of said secondary means, and a member adapted to be located in any of said positions to determine the unit of the secondary means desired; a relay circuit adapted when rendered effective to cause said motor, when said primary means does not initially lie between said intermediate and work locations, to rotate at a relatively rapid rate to cause said primary means to move uni-directionally toward said intermediate location regardless of the side of said work location on which said primary means is initially located, and until the intermediate switch corresponding to the direction of motion of the primary means is closed; and a relay circuit rendered effective by the closing of said corresponding intermediate switch for causing said motor to rotate at a relatively slow rate to move said primary means slowly toward said work location and until said worklocation switch is closed.

10. Apparatus comprising in combination, primary means movable in two directions along a path of travel and adapted automatically to be positioned at a pre-determined location therealong; rotatable mechanism positively coupled to said primary means; a multi-speed reversing motor adapted to be positively coupled to said rotatable mechanism; a switch for determining the initial direction of rotation of said reversing motor as well as said pre-determined location; separate switches for each direction of motion of said primary means for determining an intermediate location that bears a fixed relation to said pre-determined location; an actuator adapted to be adjusted relatively to said switches throughout the extent of the path of travel of said primary means; a relay circuit adapted to be rendered effective by a non-selective act to cause said motor, when said primary means is initially not between said intermediate and pre-determined locations, to rotate at a relatively rapid rate in one direction when said pre-determined location-switch is open, and until the separate switch corresponding to the direction of movement closes; a relay circuit adapted to be rendered effective by said non-selective act to cause said motor to rotate relatively rapidly in the opposite direction when said pre-determined location-switch is closed, and until the other separate switch closes; and a relay circuit rendered effective by the closing of the separate switch corresponding to the direction of the relatively rapid movement of the primary means for causing said motor to rotate relatively slowly to move said primary means to said pre-determined location.

11. In a positioning apparatus for a machine tool, a support adapted automatically to be positioned at more than two work locations, one at a time, along a path of travel; rotatable mechanism positively connected to said primary means, and adapted to move said support to said work locations; a reversing motor adapted positively to be connected to said rotatable mechanism; a detector comprising a unit for each work location at which said support is to be located, each unit including a switch and a switch actuator relatively adjustable throughout the extent of the path of travel of said support independently of the adjustment of every other unit; a selector for determining the unit of the detector desired; and a control relay circuit independent of polarity adapted to be rendered effective by a non-selective act for causing said motor to rotate in the correct direction to move said support toward said work selected location, in accordance with the setting of the unit of the detector selected by the selector.

12. In a positioning apparatus for a machine tool, a support adapted automatically to be positioned at more than two work locations, one at a time, along a path of travel; rotatable mechanism positively coupled to said support, and adapted to move it to said work locations; a multi-speed reversing motor adapted positively to be coupled to said rotatable mechanism; a detector comprising a unit for each work location at which said support is to be located, each unit including a switch for determining the initial direction of rotation of said motor as well as one of said work locations; separate switches for each direction of motion of said support for determining an intermediate location that bears a fixed relation to said work location; a switch actuator for each unit adapted to be adjusted relatively to its corresponding switches throughout the extent of the path of travel of said support; a selector for determining the unit of the detector desired; a control relay circuit adapted when rendered effective, when said support is not initially located between said intermediate and work locations, to cause uni-directional rotation of said motor and movement of said support to said intermediate location regardless of the side of the work location on which said support initially is located, and until the switch corresponding to the direction of motion is closed; and a control relay circuit adapted to be rendered effective when said corresponding motion-direction switch closes to cause said motor to rotate at a relatively slow rate of speed to effect relatively slow movement of said support to said selected work location.

13. In a positioning apparatus for a machine tool, a support adapted automatically to be positioned at more than two work locations, one at a time, along a path of travel; rotatable mechanism positively coupled to said support and adapted to move it to said work locations; a multi-speed reversing motor adapted positively to be coupled to said rotatable mechanism; a detector comprising a unit for each work location at which said support is to be located, each unit including a switch for determining the initial direction of rotation of said motor as well as one of said work locations; at least one switch for each unit for determining an intermediate location of said support that bears a fixed relation to said work location; an actuator for each unit adapted to be adjusted relatively to its corresponding switches throughout the extent of said support; a selector for determining the unit of the detector desired; a control relay circuit adapted when rendered effective to cause said motor to rotate in the correct direction to move said support to said intermediate location, and until said intermediate-location switch closes; and a control relay circuit adapted to be rendered effective when said intermediate-location switch closes to cause relatively slow rotation of said motor in a direction to move said support at a relatively slow rate of speed to said selected work location.

14. In a positioning apparatus for a machine tool, a support movable in two directions along a path of travel and adapted automatically to be positioned at a pre-determined position therealong; rotatable mechanism positively coupled to said support, and adapted to move it to said pre-determined location; a reversing motor adapted positively to be coupled to said rotatable mechanism; a make and break switch for determining the initial direction of rotation of said motor as well as the pre-determined location of said support; an actuator for said switch relatively adjustable thereto throughout the extent of the path of travel of the said support; and a relay circuit independent of polarity adapted when rendered effective by a non-selective act automatically to select and initially cause said motor to rotate in the correct direction to effect initial movement of said support toward said pre-determined location.

15. In a positioning apparatus for a machine tool, a support movable in two directions along a path of travel and adapted automatically to be positioned at a pre-determined location therealong; rotatable mechanism positively coupled to said support; a detector comprising a plurality of circuit-making and breaking switches; a switch actuator adjustable throughout the entire extent of the path of travel of said support relatively to said switches for determining said pre-determined location as well as an intermediate location which latter bears a fixed relation to said pre-determined location; a relay circuit adapted when rendered effective automatically to select and initiate the correct direction of rotation of said motor, when said support initially does not lie between said intermediate and pre-determined locations, to cause said support to move unidirectionally at a relatively rapid speed to said intermediate location, regardless of the side of said pre-determined location on which said support is initially located; and a relay circuit automatically rendered effective upon said support arriving at said intermediate location for causing said motor to be rotated at a relatively slow speed effecting movement of said support to said pre-determined location.

16. In a positioning apparatus for a machine tool, a support movable in two directions along a path of travel and adapted automatically to be positioned at a pre-determined location therealong; rotatable mechanism positively coupled to said support; a multi-speed reversing motor adapted to be coupled to said rotatable mechanism; a switch for determining the initial direction of rotation of said motor as well as said pre-determined location of said support; separate switches for each direction of motion of said support for determining an intermediate location thereof that bears a fixed relation to said pre-determined location; an actuator for said switches, adjustable relatively thereto throughout the extent of movement of said support; a relay circuit adapted when rendered effective automatically to select and initiate the correct direction of rotation of said motor when said support initially does not lie between said intermediate and pre-determined locations, to cause said support to move uni-directionally at a relatively rapid speed to said intermediate location, regardless of the side of said pre-determined location on which said support initially is located; and a relay circuit automatically rendered effective upon said support arriving at said intermediate location for causing said motor to rotate at a relatively slow speed to effect relatively slow movement of said support to said pre-determined location.

17. Apparatus comprising in combination, a primary means adapted automatically to be positioned at more than two work locations one at a time, along a path of travel; rotatable mechanism positively coupled to said primary means for moving it to said work locations; a reversing motor adapted to be positively coupled to said rotatable mechanism; a secondary means comprising a unit for each work location, each unit including independently pre-settable elements relatively adjustable throughout the extent of the path of travel of said primary means for determining one of said work locations at which said primary means is to be located; a tertiary means having a position for indicating each unit of said secondary means, and a member adapted to be located in any of said positions to determine the unit of the secondary means desired; and means including a circuit independent of polarity for initiating the correct direction of rotation of said reversing motor to initially cause it to move said primary means toward the work location determined by the unit of the secondary means selected by the tertiary means.

18. Apparatus comprising in combination, a primary means adapted automatically to be positioned at more than two work locations, one at a time, along a path of travel; rotatable mechanism positively coupled to said primary means and adapted to move it to said work locations; a multi-speed reversing motor adapted to be positively coupled to said rotatable mechanism; a secondary means comprising a unit for each position at which said primary means is to be located and including relatively adjustable elements for determining one of said work locations as well as a corresponding intermediate location, said intermediate location, bearing a fixed relation to its corresponding work location; a tertiary means having a position for indicating each unit of the secondary means, and a member adapted to be located at any of said positions to determine the unit of the secondary means desired; means including a circuit independent of polarity for causing said reversing motor to rotate at a relative rapid speed to cause said primary means to move to said intermediate location; and means for causing said reversing motor to rotate at a relatively slow speed to effect movement of said primary means to the work location determined by the unit of the secondary means selected by the tertiary means.

19. In a positioning apparatus for a machine tool, a support adapted automatically to be positioned at more than two work locations, one at a time, along a path of travel; rotatable mechanism positively connected to said primary means, and adapted to move said support to said work locations; a reversing motor adapted positively to be connected to said rotatable mechanism; a detector comprising a unit for each work location at which said support is to be located, each unit including independently pre-settable switches and a switch actuator means relatively adjustable throughout the extent of the path of travel of said support, whereby the movement of the primary means for the pre-setting of each unit of the secondary means is independent of the setting of all other units of said secondary means; a selector for determining the unit of the detector desired; and means including a circuit independent of polarity for causing said motor to rotate in the correct direction to move said support toward said selected work location, in accordance with the setting of the unit of the detector selected by the selector.

EDWARD P. BULLARD, III.
LOUIS J. BAUDIS.
CLAUDE M. GRINAGE.

REFERENCES CITED

The following references are of record in the file of this patent:

UNITED STATES PATENTS

| Number | Name | Date |
| --- | --- | --- |
| 1,462,354 | Pero | July 17, 1923 |
| 2,106,965 | Wright et al. | Feb. 1, 1938 |
| 2,298,407 | Miller | Oct. 13, 1942 |
| 2,301,171 | Norton et al. | Nov. 3, 1942 |
| 2,302,353 | Smith | Nov. 17, 1942 |
| 2,308,709 | Newman | Jan. 19, 1943 |
| 2,427,493 | Bullard | Sept. 16, 1947 |